United States Patent
White et al.

(10) Patent No.: US 12,241,013 B2
(45) Date of Patent: Mar. 4, 2025

(54) MECHANOTROPIC ELASTOMERS

(71) Applicant: The Regents of the University of Colorado, a body corporate, Denver, CO (US)

(72) Inventors: Timothy White, Longmont, CO (US); Brian Richard Donovan, Boulder, CO (US)

(73) Assignee: THE REGENTS OF THE UNIVERSITY OF COLORADO, A BODY CORPORATE, Denver, CO (US)

(*) Notice: Subject to any disclaimer, the term of this patent is extended or adjusted under 35 U.S.C. 154(b) by 0 days.

(21) Appl. No.: 17/615,021

(22) PCT Filed: May 28, 2020

(86) PCT No.: PCT/US2020/034822
§ 371 (c)(1),
(2) Date: Nov. 29, 2021

(87) PCT Pub. No.: WO2020/243235
PCT Pub. Date: Dec. 3, 2020

(65) Prior Publication Data
US 2022/0235269 A1 Jul. 28, 2022

Related U.S. Application Data

(60) Provisional application No. 62/855,195, filed on May 31, 2019.

(51) Int. Cl.
C09K 19/54 (2006.01)
C09K 19/04 (2006.01)

(52) U.S. Cl.
CPC ............ C09K 19/542 (2013.01); C09K 19/04 (2013.01); *C09K 2019/0448* (2013.01)

(58) Field of Classification Search
CPC ...... C09K 19/542; C09K 19/04; C09K 19/54; C09K 19/38; C09K 19/0448; C09K 19/3804; C09K 19/0444
See application file for complete search history.

(56) References Cited

U.S. PATENT DOCUMENTS

| | | | |
|---|---|---|---|
| 7,782,429 B2 | 8/2010 | Tomonaga et al. | |
| 2016/0313607 A1* | 10/2016 | White | G02F 1/133788 |
| 2018/0208847 A1 | 7/2018 | White et al. | |
| 2019/0077071 A1 | 3/2019 | Ware et al. | |
| 2022/0235269 A1* | 7/2022 | White | C09K 19/04 |

FOREIGN PATENT DOCUMENTS

WO 2012126695 A1 9/2012

OTHER PUBLICATIONS

Ware et al., "Programmable Liquid Crystal Elastomers Prepared by Thiol-Ene Photopolymerization", ACS Macro Lett. 2015, 4, 9, 942-946 (Year: 2015).*
Hessberger et al., "Microfluidic Synthesis of Actuating Microparticles from a Thiol-Ene Based Main-Chain Liquid Crystalline Elastomer", Polymers 2016, 8, 410. https://doi.org/10.3390/polym8120410 (Year: 2016).*
Donovan et al., "Mechanotropic Elastomers", Jun. 20, 2019, Angewandte Chemie International Edition, vol. 58, Issue 39, pp. 13744-13748 (Year: 2019).*
Oh et al. Synthesis of New Liquid Crystaline Monomer and its Preparation for Optical Retardation Film, Journal of Korean Society for Imaging Science & Technology, vol. 18, No. 2, Jun. 2012, pp. 27-34.

* cited by examiner

*Primary Examiner* — Geraldina Visconti
(74) *Attorney, Agent, or Firm* — Holzer Patel Drennan

(57) ABSTRACT

Isotropic (amorphous) elastomers and methods of preparation are described. The isotropic elastomer may include a first monomer having an alkene functionality and a second monomer having a thiol functionality. The first monomer may be a liquid crystal monomer and the second monomer may be an isotropic monomer. Unlike polydomain LCEs, the isotropic elastomers may rapidly recover after deformation and have increased toughness relative to conventional elastomers prepared from wholly isotropic precursors.

14 Claims, 16 Drawing Sheets

MECHANOTROPIC ELASTOMERS

CROSS-REFERENCE TO RELATED APPLICATION(S)

This application is a U.S. National Stage Application of International Patent Application No. PCT/US2020/034822, filed on May 28, 2020, which claims priority under 35 U.S.C. § 119(e) to U.S. Provisional Patent Application No. 62/855,195, titled "Mechanotropic Elastomers" and filed May 31, 2019, the entirety of which is hereby incorporated by reference.

TECHNICAL FIELD

This disclosure relates to isotropic (amorphous) elastomers that exhibit mechanotropic phase transitions and thereby provide improved physical characteristics as compared to liquid crystal elastomers (LCE). More specifically, the isotropic elastomers described herein comprise both isotropic and liquid crystal monomers so as to exhibit nonlinear mechanical deformation similar to that of LCEs, but while also rapidly recovering from deformation. Methods of preparing isotropic elastomers are also described herein.

BACKGROUND

Robust, elastomeric materials continue to enable considerable function in the automotive, textile and sporting goods industries. A unique subset of elastomeric materials are liquid crystal elastomers (LCE). LCEs retain a liquid crystalline (LC) phase with either local (polydomain) or global (monodomain) orientation. Substantial prior research efforts have documented the stimuli-responsive behavior of these materials. The coupling between the orientation and viscoelastic nature of these materials also gives rise to distinctive nonlinear mechanical deformation, attributable to the reorientation of the mesogens in the polymer network of the LCEs. Specifically, when loaded, the domain orientation aligns to the stretch direction and a "soft" elastic response is observed at low to moderate strains. At larger elongations, or when monodomain LCEs are stretched parallel to the director orientation, strain hardening is observed as mesogens align along the loading axis.

Regardless of the manner in which polydomain LCEs are prepared (i.e., via isotropic genesis or nematic genesis), the LCEs display nonlinear mechanical behavior and slow elastic recovery subsequent to deformation. Recent literature reports describe the functional utility of the deformation of LCEs to load as substrates in flexible electronics. However, physical characteristics such as slow elastic recovery remain an undesirable attribute of LCEs. Accordingly, a need has arisen for elastomeric materials that exhibit the nonlinear mechanical behavior of LCEs, but which also rapidly recover after deformation and generally exhibit improved toughness.

BRIEF DESCRIPTION OF THE DRAWINGS

Non-limiting and non-exhaustive embodiments of the disclosed isotropic elastomer, including the preferred embodiment, are described with reference to the following figures, wherein like reference numerals refer to like parts throughout the various views unless otherwise specified.

DETAILED DESCRIPTION

Figure 1:
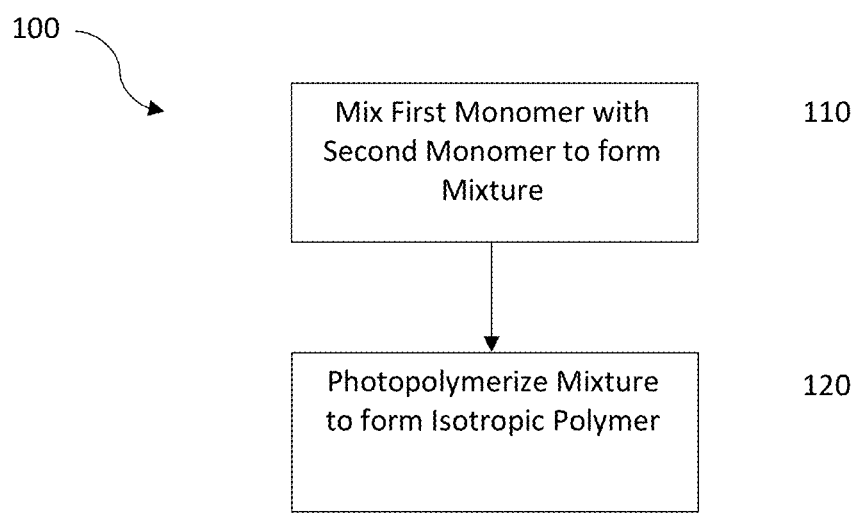
FIG. 1 is a flow chart illustrating a method of preparing isotropic elastomers according to various embodiments described herein.

Embodiments are described more fully below with reference to the accompanying Figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth therein. The following detailed description is, therefore, not to be taken in a limiting sense.

Described herein are various embodiments of isotropic elastomers and methods of making the same. The isotropic elastomers described herein exhibit mechanotropic properties. In some embodiments, the elastomers described herein comprise a first monomer having an alkene functionality and a second monomer having a thiol functionality, and wherein the second monomer is an isotropic monomer. In some embodiments, the first monomer is a liquid crystal monomer, and the amount of liquid crystal monomer in the elastomer can range from greater than 50 wt % to less than 99 wt % of the elastomer composition. In some embodiments, the ratio between the alkene functionality of the first monomer and thiol functionality of the second monomer is about 1:1. Embodiments of a method for forming the isotropic elastomer can comprise photopolymerizing the first monomer and the second monomer, wherein the first monomer and the second monomer are similar or identical to the first monomer and second monomer described previously.

With respect to the isotropic elastomer, in some embodiments described herein, the isotropic elastomer comprises a first monomer and a second monomer, wherein the first monomer has an alkene functionality and the second monomer has a thiol functionality. Generally speaking, the first monomer and the second monomer are polymerized to form a polymer, wherein the polymer can be the isotropic elastomer described herein. In some embodiments, polymerization of the first monomer and the second monomer includes forming a covalent bond between the alkene functionality of the first monomer and the thiol functionality of the second monomer. Other bonding mechanisms between the first monomer and the second monomer to form the polymer in addition to or in place of covalent bonding between the thiol and alkene functionalities are also possible.

The first monomer includes at least an alkene functionality. The specific alkene functionality of the first monomer is not limited. Exemplary though non-limiting alkene functionalities include acrylates, vinyl ethers, norbornenes and vinyls. In some embodiments, the first monomer is a liquid crystal monomer possessing the alkene functionality. The specific liquid crystal monomer suitable for use as the first monomer having an alkene functionality is generally not limited provided the liquid crystal monomer includes an alkene functionality. Non-limiting examples of a liquid crystal monomer suitable for use as the first monomer in the isotropic elastomer described herein include 2-methyl-1,4-phenylene bis(4-(3-(allyloxy)propoxy)benzoate) (referred to herein as RM2AE) and 2-methyl-1,4-phenylene bis(4-(6-mercaptohexyloxy)benzoate (referred to herein as RM2SH).

The isotropic elastomer includes at least one first monomer as previously described, though it should be appreciated that the isotropic elastomer may include more than one compound satisfying the description of the first monomer provided herein. For example, in some embodiments, the isotropic elastomer may include both RM2AE and RM2SH.

In some embodiments, the liquid crystal monomer component of the isotropic elastomer comprises from about 50 to about 99 wt % of the isotropic polymer, such as from about 60 wt % to about 80 wt %. In some embodiments, the isotropic polymer comprises about 66 wt % liquid crystal monomer, while in other embodiments, the isotropic polymer comprises about 75 wt % liquid crystal monomer. The amount of liquid crystal monomer in the isotropic polymer can be from a single liquid crystal monomer or from a combination of liquid crystal monomers. Regardless of the amount of liquid crystal monomer included in the isotropic polymer, the 1:1 stochiometric ratio between the alkene and thiol functional groups of the first and second monomer is maintained in some embodiments. However, it should be appreciated that stochiometric ratios other than 1:1 can be used. In some embodiments, the stochiometric ratio does not play a significant role provided that the material gels. In some embodiments, it may even be beneficial to have unreacted groups by virtue of a non-1:1 ratio, as these unreacted groups may then be used for post-modification.

The second monomer includes at least a thiol functionality. The specific thiol functionality of the second monomer is not limited. Exemplary though non-limiting thiol functionalities include mercaptoacetates, mercaptopropionates, and aliphatic thiols. In some embodiments, the second monomer is an isotropic monomer possessing the thiol functionality. The specific isotropic monomer suitable for use as the second monomer having a thiol functionality is generally not limited provided the isotropic monomer includes a thiol functionality. Non-limiting examples of an isotropic monomer suitable for use as the second monomer in the isotropic elastomer described herein include tris(3-mercaptopropionate (TMPMP), trimethylolpropane diallyl ether (TMPDA), and ethylene glycol bis(3-mercaptopropionate) (GDMP).

The isotropic elastomer includes at least one second monomer as previously described, though it should be appreciated that the isotropic elastomer may include more than one compound satisfying the description of the second monomer provided herein. For example, in some embodiments, the isotropic elastomer may include both TMPMP and GDMP.

In some embodiments, the isotropic monomer component of the isotropic elastomer comprises from about 1 to about 50 wt % of the isotropic polymer, such as from about 20 wt % to about 40 wt %. In some embodiments, the isotropic polymer comprises about 33 wt % isotropic monomer, while in other embodiments, the isotropic polymer comprises about 25 wt % isotropic monomer. In some embodiments, the amount of isotropic monomer is dependent on the amount of liquid crystal monomer, i.e., the isotropic monomer makes up the balance of the composition of the isotropic polymer after the amount of liquid crystal monomer has been established. The amount of isotropic monomer in the isotropic polymer can be from a single isotropic monomer or from a combination of isotropic monomers. Regardless of the amount of isotroppic monomer included in the isotropic polymer, the 1:1 stochiometric ratio between the alkene and thiol functional groups of the first and second monomer is maintained.

Generally speaking, the presence of the isotropic monomer in the isotropic elastomer in the amounts described previously serve to inhibit, suppress or prevent the formation of a liquid crystal phase in the isotropic elastomer. As described in greater detail later, the suppression of the formation of an LC phase in the isotropic elastomer by the inclusion of the isotropic monomer has been confirmed by the absence of birefringence when the isotropic elastomer is viewed under cross polarizers. In some embodiments, the inhibition, suppression and/or prevention of an LC phase in the isotropic elastomer is observed at least until an external force (e.g., external load, stress, strain, etc.) is applied to the isotropic elastomer. In some embodiments, the absence of an LC phase in the isotropic elastomer is maintained even after the application of external forces to the isotropic elastomer.

With reference to FIG. 1, a method 100 of preparing the isotropic elastomer described previously generally comprises a step 110 of mixing together a first monomer and a second monomer, and a step 120 of photopolymerizing the mixture for form the isotropic elastomers. In step 110, the first and second monomers mixed together to form a mixture are generally similar or identical to the first and second monomers described previously. That is to say, the first monomer includes an alkene functionality and may be a liquid crystal monomer, while the second monomer includes a thiol functionality and may be an isotropic monomer. Any suitable manner of mixing can be used, including any order of adding components and the use of any suitable mixing equipment at any desired mixing settings.

The amount of each monomer used to form the mixture is generally as described previously, wherein the first monomer is from 50 to 99 wt % and the second monomer is from 1 to 50 wt %, and a 1:1 stochiometric ratio between the alkene and thiol functionalities is maintained. As also discussed previously, the first monomer used to form the mixture may comprise one or more first monomers and the second monomer used to form the mixture may comprise one or more second monomers. In a particular embodiment, the first monomer is RM2AE and the second monomer is a combination of TMPMP and GDMP. In this embodiment, the RM2AE can be provided at an amount of about 66 wt % and the combination of TMPMP and GMDP is about 33 wt % of the composition. Any su In step 120, the mixture is subjected to photopolymerization to form the isotropic polymer. Any suitable manner of photopolymerizing the mixture, including the use of any suitable equipment at any suitable settings, can be used. In one non-limiting example, photopolymerization is carried out at 80° C. with a 405 nm light source. In some embodiments, photopolymerization results in the formation of covalent bonds between the thiol and alkene functional groups, though as mentioned previously, other bonding mechanisms may be present in the isotropic elastomer.

In some embodiments, additional constituents are used in the process of making the isotropic elastomer in order to facilitate subsequent processing of the isotropic elastomer, such as processing the isotropic elastomer into specific forms. In one non-limiting example, additional liquid crystal monomer can be used in the process such that polydomain films can be prepared. Using the previously described example of a mixture including about 66 wt % RM2AE as the first monomer and about 33 wt % of a combination of TMPMP and GDMP, an additional amount of the dithiol LC monomer RM2SH can be added such that the composition includes 75 wt % of first monomer to thereby allow for the formation of polydomain films from the isotropic elastomer.

EXAMPLES

Example 1

Figure 2A:
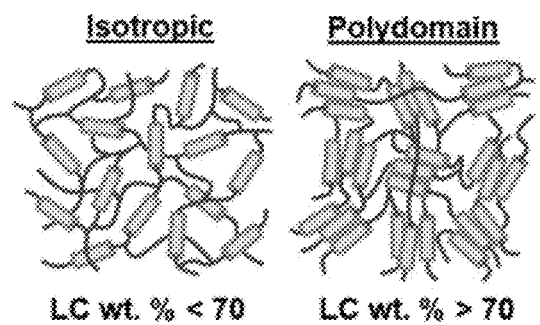
FIG. 2A is an Illustration of mesogenic units (cylinders) within the isotropic elastomer according to various embodiments described herein and previously known polydomain LCE compositions.

Photopolymerization of thiol-ene precursors to prepare polymer networks was carried out. The isotropic state was defined as absent of measurable anisotropy or orientation (FIG. 2A, "Isotropic"). The polydomain orientation was defined as including localized oriented domains (FIG. 2A, "Polydomain").

Figure 2B:
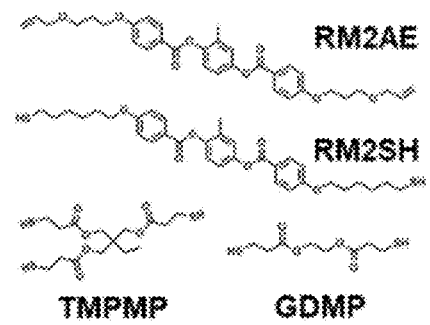
FIG. 2B is an illustration of thiol and allyl ether monomers used to synthesize the elastomeric compositions according to various embodiments described herein.
Figure 2C:
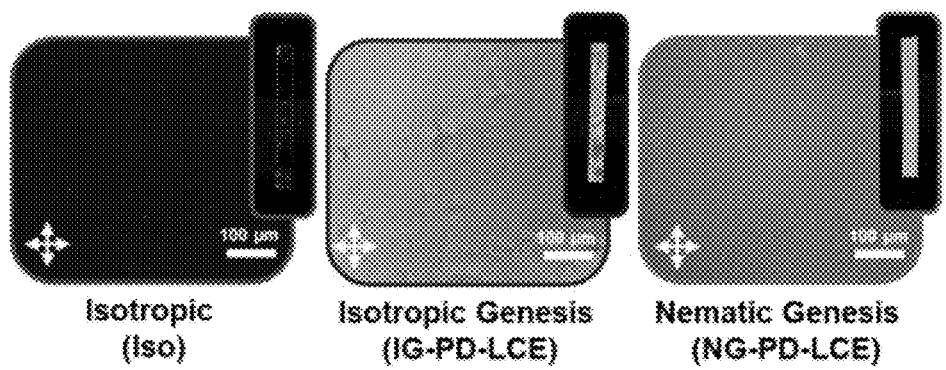
FIG. 2C are polarized optical microscope (POM) images of an isotropic polymer composition (Iso) according to various embodiments described herein, an isotropic-genesis polydomain (IG-PD-LCE) composition, and a nematic-genesis polydomain (NG-PD-LCE) composition observed under polarized optical microscope, wherein insets for each POM are photographs of macroscopic samples (12×3 mm) under cross polarizers.

An isotropic composition ("Iso") was prepared by mixing RM2AE, TMPMP, and GDMP (FIG. 2B) at a 1:1 stoichiometric functional group ratio prior to photopolymerization at 80° C. with a 405 nm light source (10 mins, 50 mW/cm2). Although the material is isotropic, the fraction of liquid crystalline monomer in the formulation was approximately 66 wt %. The isotropic monomers (GDMP, TMPMP) were found to suppress the formation of a LC phase, confirmed by the absence of birefringence when this material is viewed under crossed polarizers (FIG. 2C). Polydomain films were prepared by the inclusion of the dithiol LC monomer, RM2SH (FIG. 2B) to increase the relative concentration of LC monomer to 75 wt %.

Figure 3A:
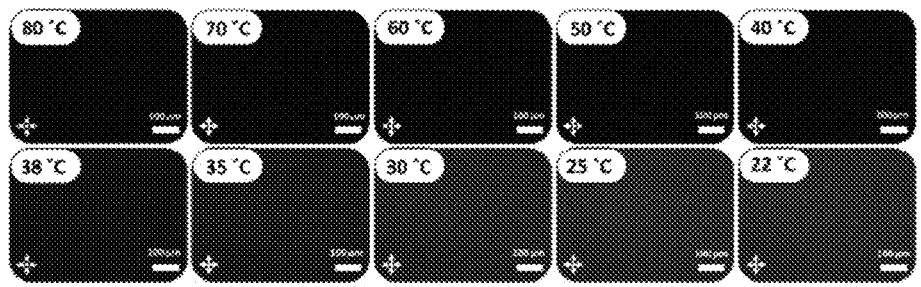
FIG. 3A are a series of POM images of polydomain formulation phase behavior prior to polymerization at various temperatures.
Figure 3B:
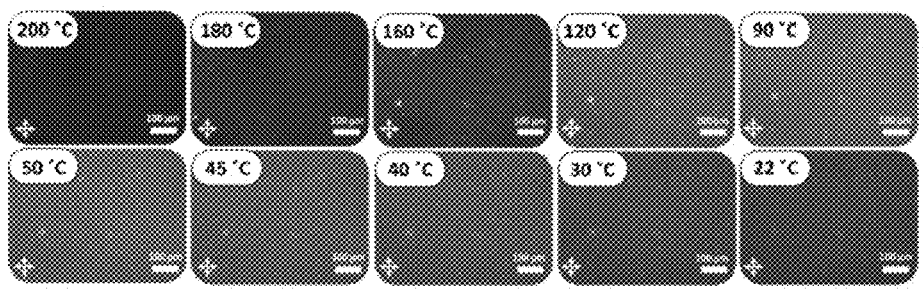
FIG. 3B are a series of POM images of NG-PD-LCE film post polymerization at various temperatures.
Figure 3C:
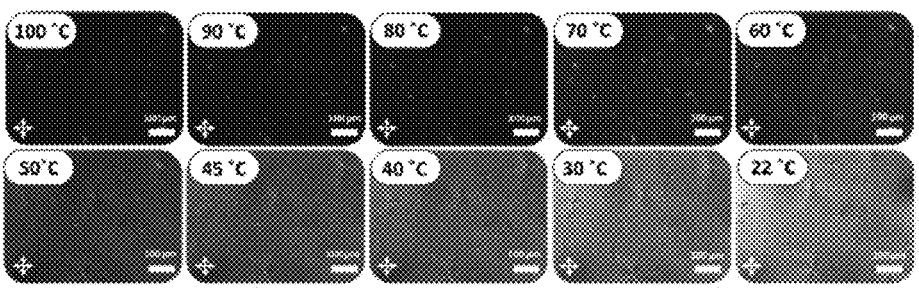
FIG. 3C are a series of POM images of IG-PD-LCE film post polymerization at various temperatures.

Polydomain LCEs were prepared in either the isotropic state (isotropic-genesis, "IG-PD-LCE"; 405 nm photopolymerization at 80° C. followed by slow cooling to the LC phase) or the nematic state (nematic-genesis, "NG-PD-LCE"; cooled to the LC phase prior to 405 nm photopolymerization at room temperature). Birefringence is evident in both the IG-PD-LCE and NG-PD-LCE materials when viewed under cross polarizers (FIG. 2C). Differential scanning calorimetry (DSC) of the IG-PD-LCE composition identified a TNI at ~73° C. (similar observations were made while conducting temperature sweeps with a polarized optical microscope, see FIGS. 3A-3C). Though no clear TNI was observed for the NG-PD-LCE composition in DSC, the birefringence observed, and the optical opacity of the film strongly confirms the polydomain orientation (FIGS. 3A-3C). The Iso, IG-PD-LCE, and NG-PD-LCE compositions were formulated to prepare materials with identical crosslink density and similar glass transition temperatures (Tg) and gel fractions (Table 1).

TABLE 1

Materials properties of Iso, NG-PD-LCE, and IG-PD-LCE films

| LCE Film | $T_g$ (° C.) | $T_{NI}$ (° C.) | Gel Frac. (%) | Stress at Break (MPa) | Strain at Break (%) |
|---|---|---|---|---|---|
| Iso | −5.44 | n/a | 96.4 ± 1.6 | 7.44 ± 1.41 | 273 ± 10 |
| NG-PD-LCE | −2.15 | n/a | 97.2 ± 1.0 | 7.53 ± 1.01 | 272 ± 14 |
| IG-PD-LCE | −0.75 | 73.29 | 94.4 ± 1.0 | 11.7 ± 1.19 | 265 ± 3 |

Example 2

Figure 4A:
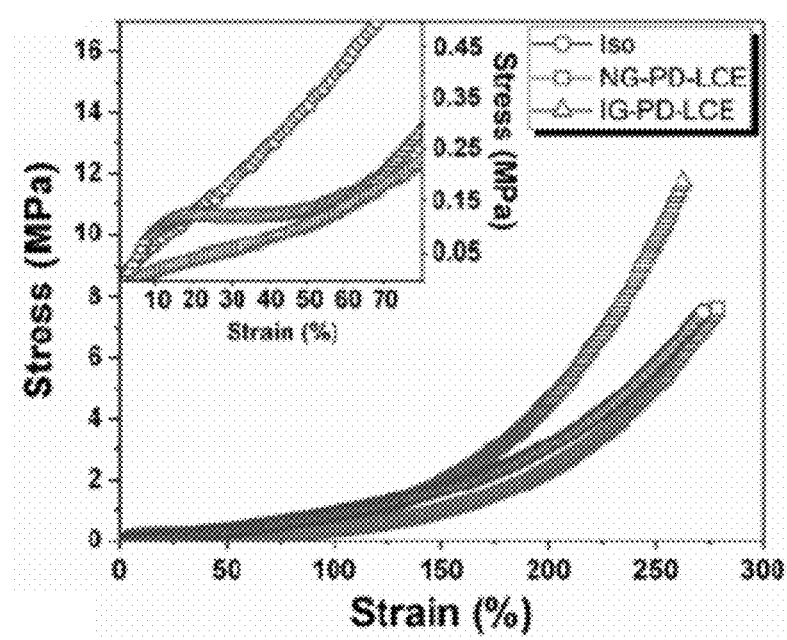
FIG. 4A is a graph showing representative elastic deformation of Iso, NG-PD-LCE, and IG-PD-LCE to tensile load, including an inset showing deformation at strain values below 70%.

The nonlinear mechanical deformation of the Iso, IG-PD-LCE, and NG-PD-LCE compositions was investigated by cutting the materials into rectangular gages with an aspect ratio of 4 prior to tensile loading at a strain rate of 10% min-1. The results are displayed in FIG. 4A and summarized in Table 1. Overall, the materials display similar strain at break, with values of 273±10%, 272±14%, and 265±3%, respectively. Stress at break, however, showed comparatively more variation, with values increasing from 7.44±1.41 MPa (Iso), to 7.53±1.01 MPa (NG-PD-LCE) and 11.7±1.19 (IG-PD-LCE). All three compositions exhibit strain hardening at elongations beyond 150% strain. In prior examinations of mechanical deformation of LCEs, this behavior is observed following the reorientation of LC mesogens in the direction of the applied stress. Though the IG-PD-LCE composition shows the greatest degree of strain hardening, the Iso composition exhibits analogous behavior (reaching values comparable to that of the nematic-genesis polydomain), potentially indicating that LC reorientation is also able to occur from an initially disordered state.

Figure 4B:
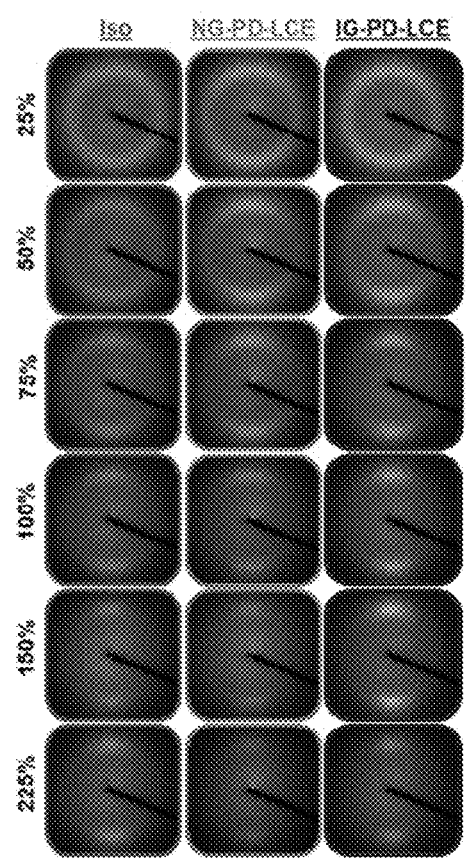
FIG. 4B is a series of wide-angle x-ray diffraction (WAXD) patterns of various elastomers from 25-225% strain.
Figure 4C:
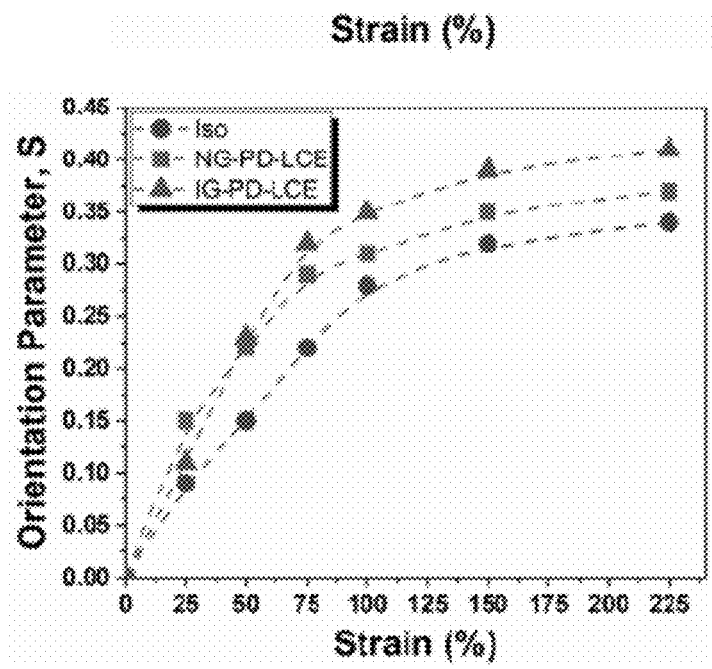
FIG. 4C is graph showing orientation parameter values measured by WAXD for the materials described herein as a function of strain.
Figure 5:
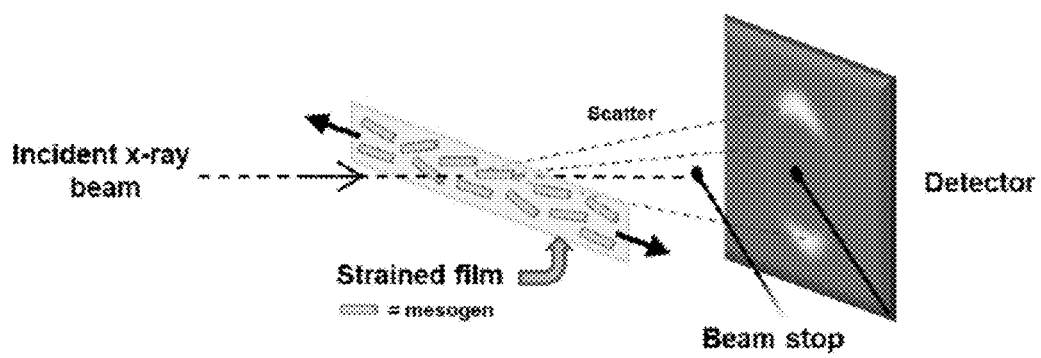
FIG. 5 is an illustration of a WAXD experimental setup wherein the illustration indicates film orientation and elongation direction relative to the x-ray beam path.
Figure 6A:
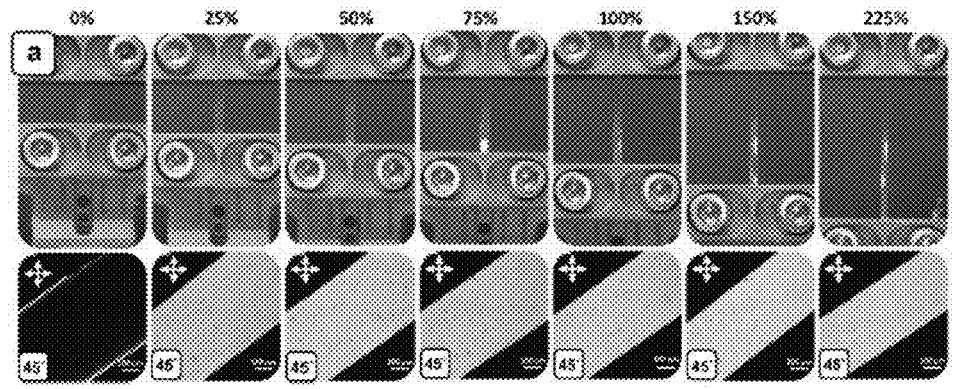
FIG. 6A is a series of POM and optical images of Iso elastomer films under elongation, wherein angle values on POM images represent the rotation degree of the film between cross-polarizers.
Figure 6B:
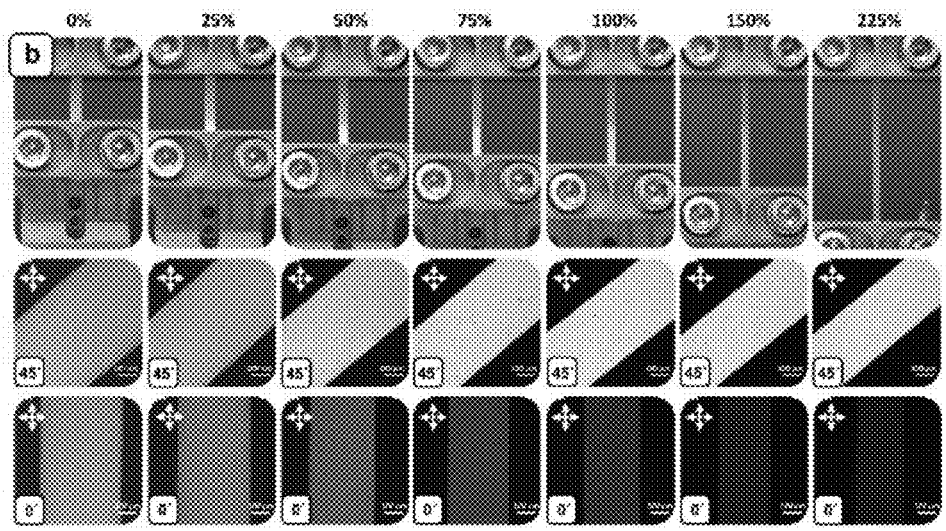
FIG. 6B is a series of POM and optical images of NG-PD-PCE elastomer films under elongation, wherein angle values on POM images represent the rotation degree of the film between cross-polarizers.
Figure 6C:
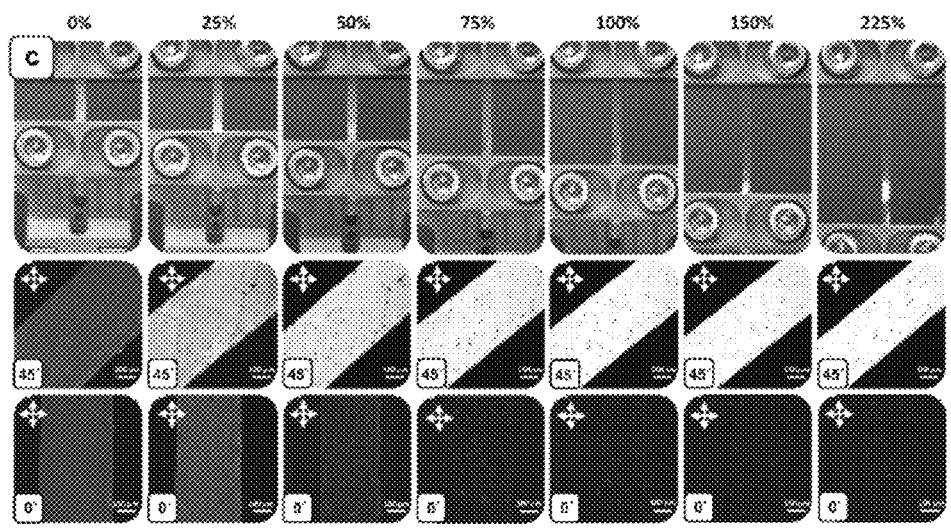
FIG. 6C is a series of POM and optical images of NG-PD-PCE LCE elastomer films under elongation, wherein angle values on POM images represent the rotation degree of the film between cross-polarizers.

Wide-angle x-ray diffraction (WAXD) was used to monitor the orientation of Iso, IG-PD-LCE, and NG-PD-LCE during deformation from 25-225% strain. The WAXD patterns and the calculated orientation parameter, S, are presented in FIGS. 4B and 4C, respectively (samples were stretched in the horizontal axis for WAXD measurements, see FIG. 5). Mechanically induced orientation is apparent in all three compositions. For the Iso film, orientation steadily increases reaching an orientation parameter of 0.34 at 225% strain. The NG-PD-LCE and IG-PD-LCE materials also exhibit an increase in order parameter with increasing strain. Orientation parameters observed for the NG-PD-LCE and IG-PD-LCE compositions at 225% (0.37 and 0.41, respectively) are slightly greater than those observed for the Iso composition. It is hypothesized (without wishing to be bound by theory) that the slight increase in orientation parameter for the polydomain films are largely the result of the increased LC concentration. Polydomain films are characterized by a strain-induced polydomain-monodomain (PD-MD) transition. This transition is most evident in the IG-PD-LCE film, where a well-defined soft elastic plateau is observed between 10% to 75% (see inset, FIG. 4A). During this elongation, the material transitioned from opaque to transparent (FIGS. 6A-6C) and the orientation parameter increased nearly three-fold from 0.11 (25% strain) to 0.32 (75% strain). The larger increase in order parameter relative to the increase observed for the NG-PD-LCE and Iso films over the same strains (orientation parameter increases of 0.15 to 0.29 and 0.09 to 0.22, respectively, from 25% to 75% strain) further confirms the PD-MD transition, in agreement with previous measurements in isotropic-genesis polydomain LCEs. Neither the NG-PD-LCE or Iso compositions display a soft-elastic plateau. Upon deformation, both of the materials undergo a steady increase in order parameter. Though NG-PD-LCE does not display a clear soft-elastic plateau, the deformation does exhibit some nonlinearity relative to the Iso material, most evident in the decreased modulus in the initial regions of the stress-strain curves (and the increased LC reorientation observed under comparable strains). However, the Iso composition uniquely exhibits a mechanotropic orientation into a highly aligned state. The observed reorientation in the Iso sample results in strain hardening behavior similar to the nematic-genesis polydomain LCE (NG-PD-LCE).

Example 3

An important functional consideration of elastomeric materials is elastic recovery. The Iso, NG-PD-LCE, and IG-PD-LCE materials were subjected to classical creep-recovery experiments at various static forces. FIGS. 7A-7C summarizes the displacement of these materials to 0.1 N force and the subsequent recovery. The trends apparent in FIGS. 7A-7C are representative of the elastic behavior regardless of the magnitude of applied force (see FIG. 8). Similar to the tensile data of FIG. 4A, the polydomain LCE materials are comparatively soft relative to the Iso film. Strain values increased from 70% for the Iso material to approximately 120% and 100% for the NG-PD-LCE and IG-PD-LCE materials, respectively. Additionally, the polydomain LCEs creep under the application of a continuous force for 10 minutes. For example, the Iso film reaches 96% of its maximum strain value within 15 seconds before quickly plateauing at its maximum strain. Conversely, the NG-PD-LCE and IG-PD-LCE films reach 66% and 68% of their maximum strain values, respectively, after 15 seconds and then continue to elongate until the static force is released. This behavior further exemplifies the soft-elastic response observed in polydomain materials, as the LC monomers continuously reorient to accommodate the stress generated within the composition (most clearly observed in the IG-PD-LCE film, FIG. 8C). Although mechanotropic, the isotropic character of the Iso film enables more traditional elastomeric deformation and recovery.

Figure 7:
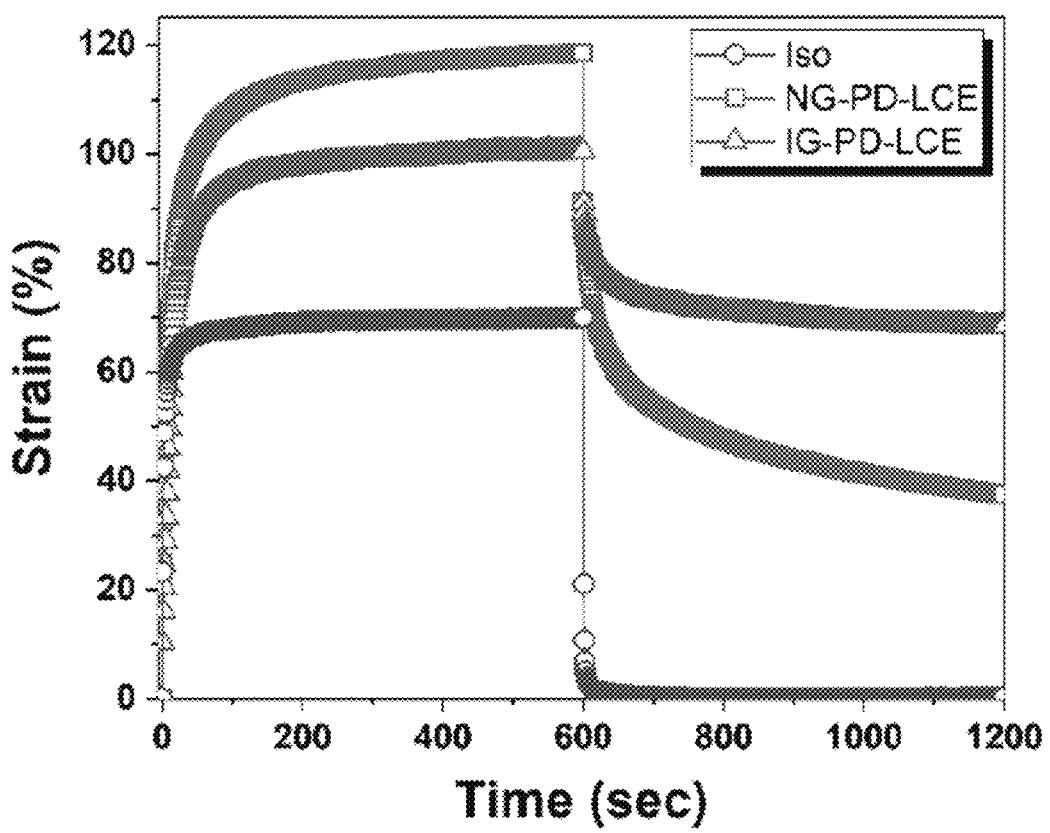
FIG. 7 is a graph showing strain values measured for the Iso, NG-PD-LCE, and IG-PD-LCE LCE films upon application of a 0.1 N static force, in which strain was monitored for 10 minutes during and for 10 minutes following the removal of force.
Figure 8A:
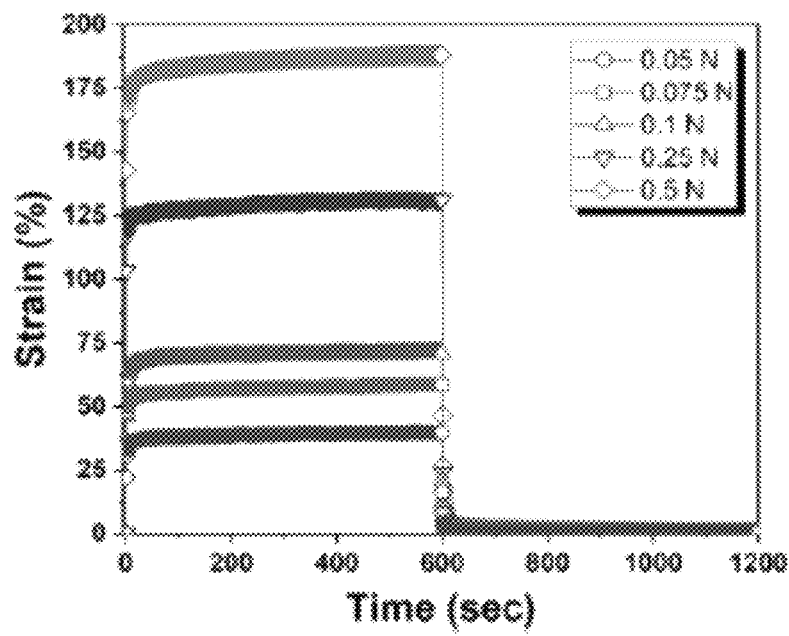
FIG. 8A is a series of POM images of the 66 wt % LC isotropic films at low strains.
Figure 8B:
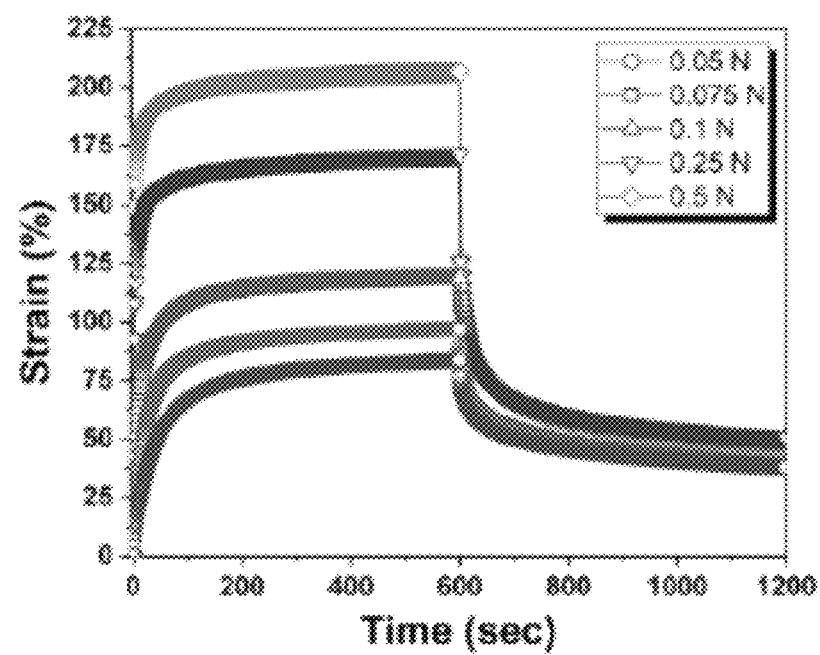
FIG. 8B is a series of POM images of the 50 wt % LC isotropic films at low strains.
Figure 8C:
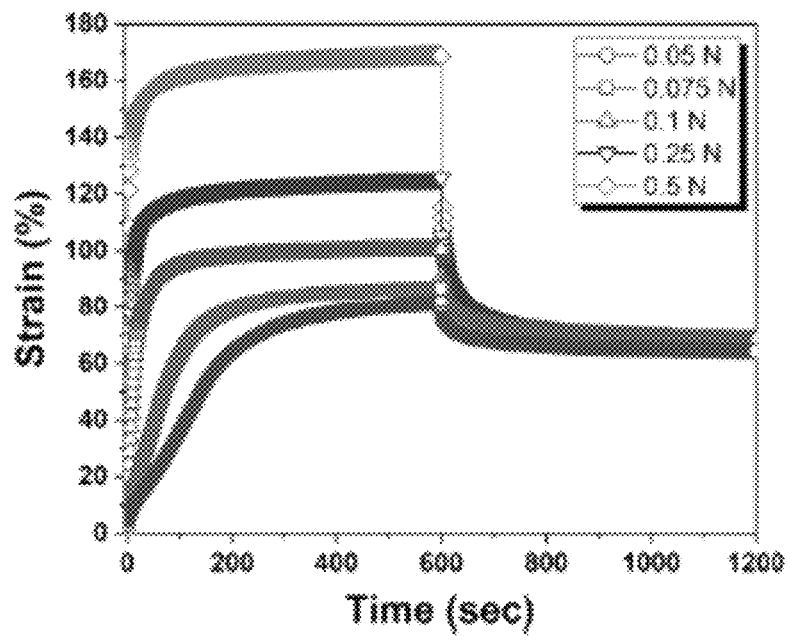
FIG. 8C is a series of POM images of the 33 wt % LC isotropic films at low strains.
Figure 9A:
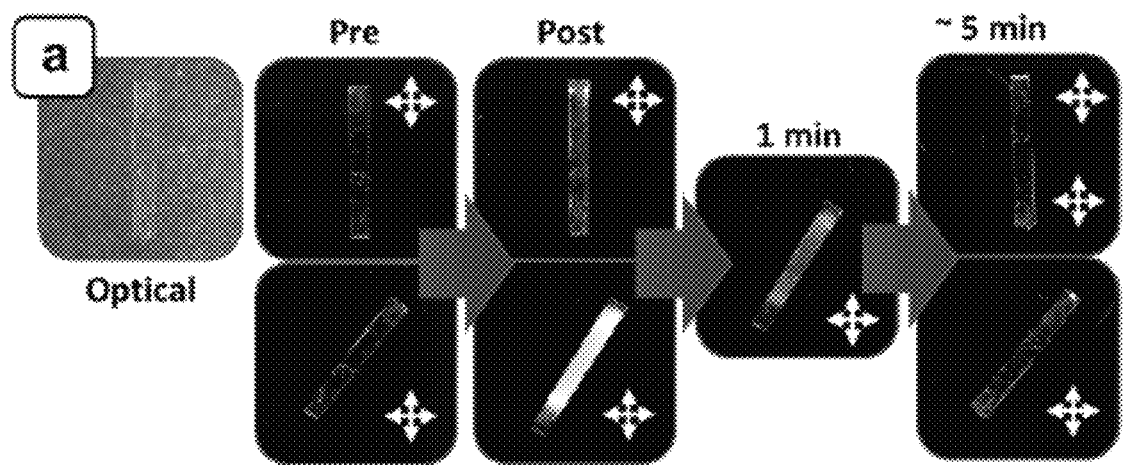
FIG. 9A is a creep-recovery graph for Iso film showing creep-recovery behavior at various static forces.
Figure 9B:
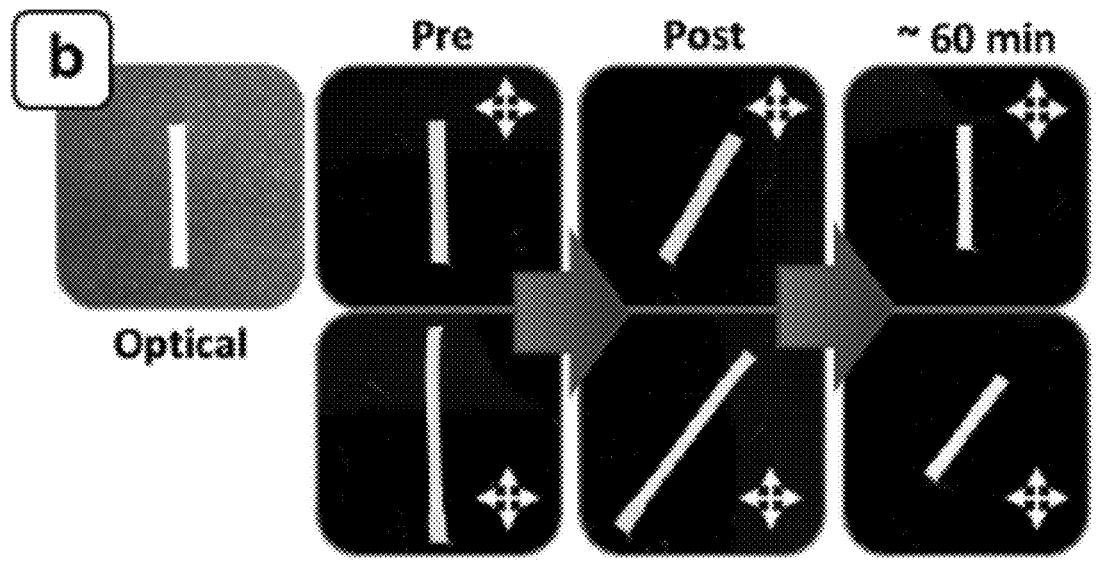
FIG. 9B is a creep-recovery graph for NG-PD-LCE film showing creep-recovery behavior at various static forces.
Figure 9C:
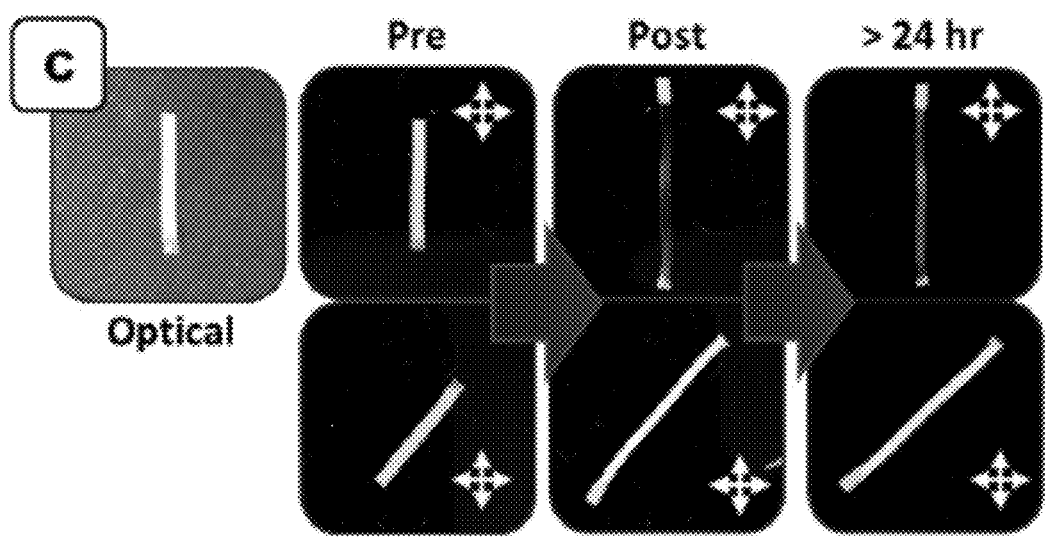
FIG. 9C is a creep-recovery graph for IG-PD-LCE film showing creep-recovery behavior at various static forces.
Figure 10A:
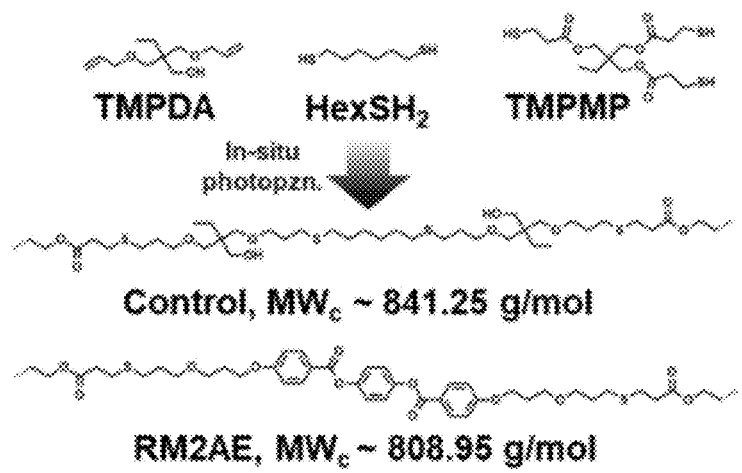
FIG. 10A illustrates chemical structures for monomers used in the synthesis of the control thiol-ene network and the corresponding molecular weights between crosslinks
Figure 10B:
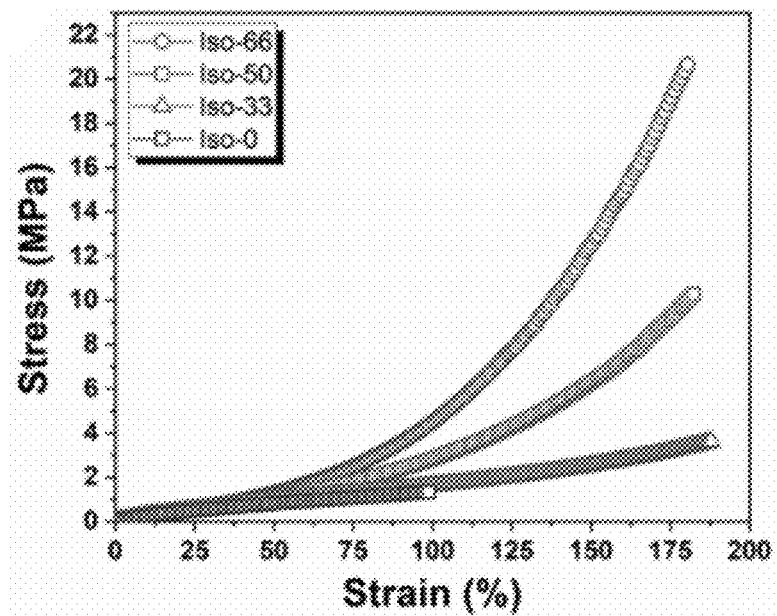
FIG. 10B is a graph showing representative stress-strain curves for the isotropic thiol-ene films containing varied concentrations of liquid crystal monomer.
Figure 10C:
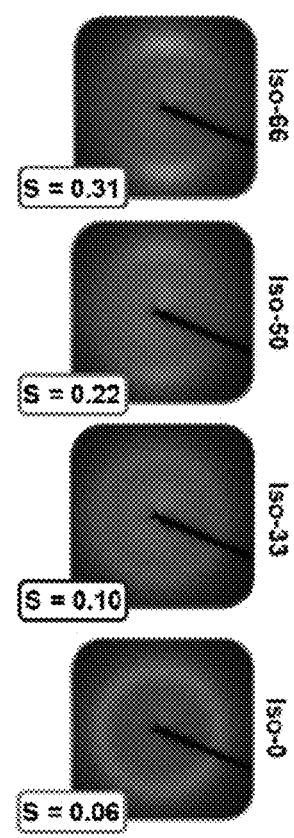
FIG. 10C illustrates WAXD patterns and order parameters of the isotropic thiol-ene films at their respective maximum achievable elongations.
Figure 11:
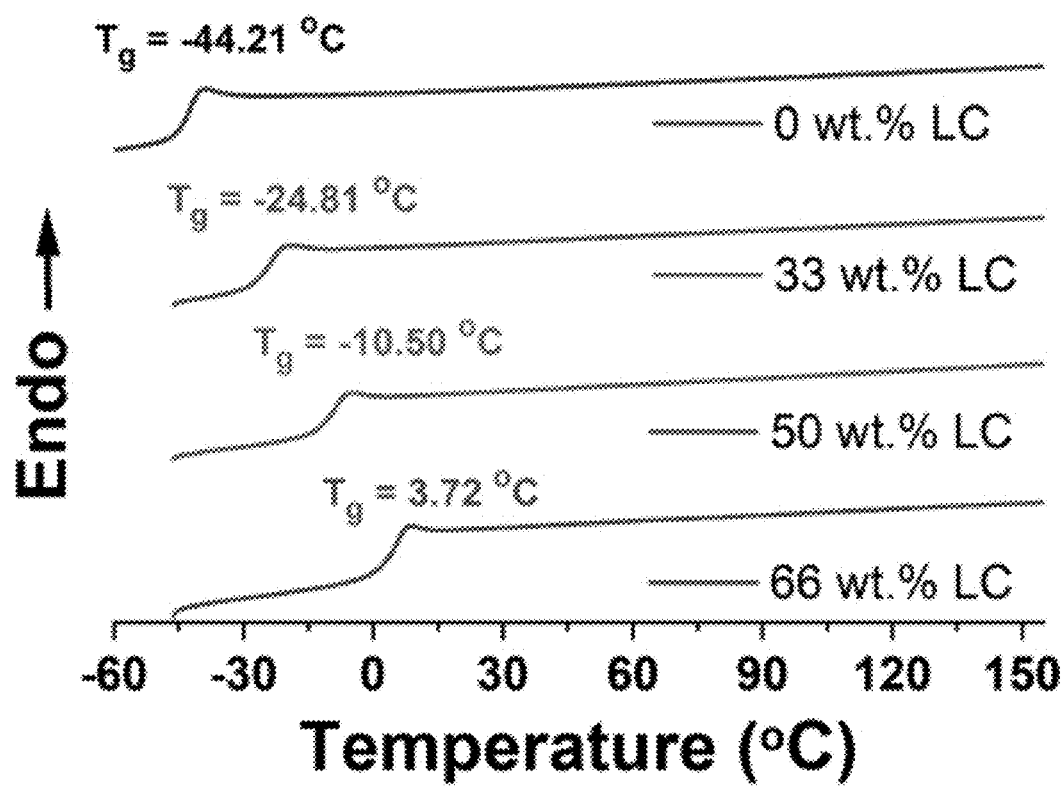
FIG. 11 is a graph showing DSC curves of varied wt. % LC isotropic films.
Figure 12A:
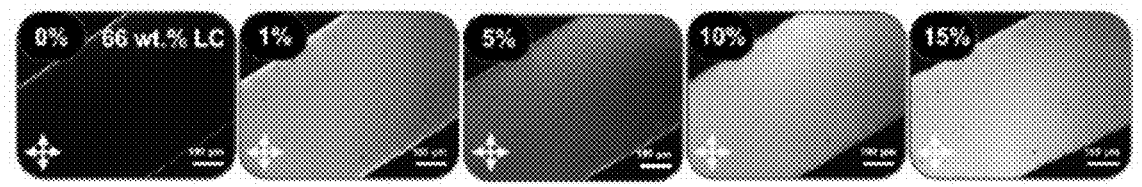
FIG. 12A is a series of POM images at different strains for 66 wt % LC isotropic films.
Figure 12B:
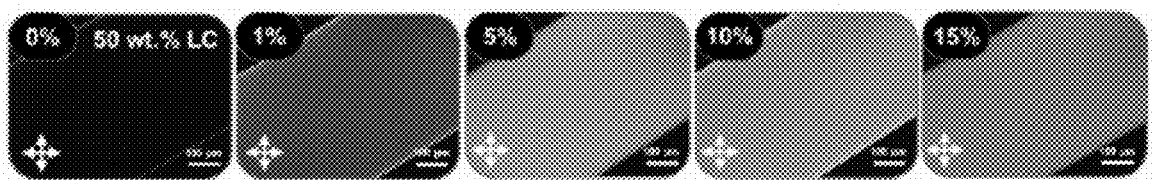
FIG. 12B is a series of POM images at different strains for 50 wt % LC isotropic films.
Figure 12C:
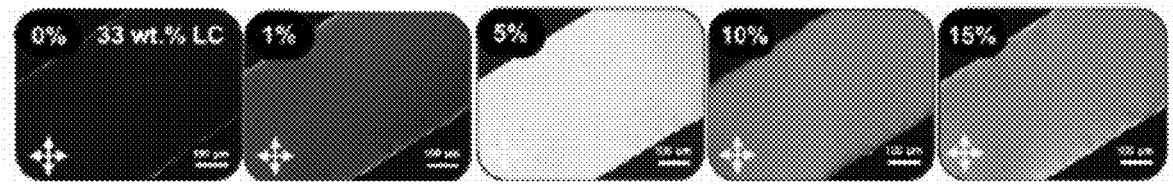
FIG. 12C is a series of POM images at different strains for 33 wt % LC isotropic films.
Figure 12D:
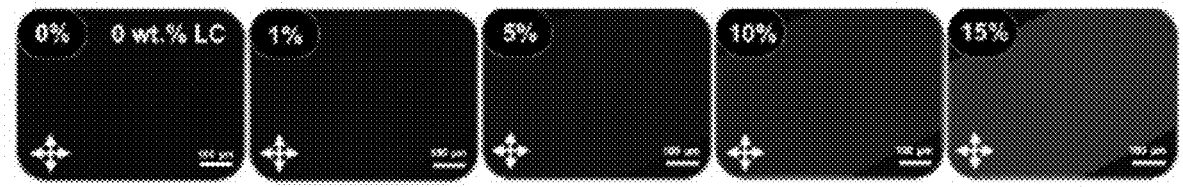
FIG. 12D is a series of POM images at different strains for 0 wt % LC isotropic films.
Figure 13A:
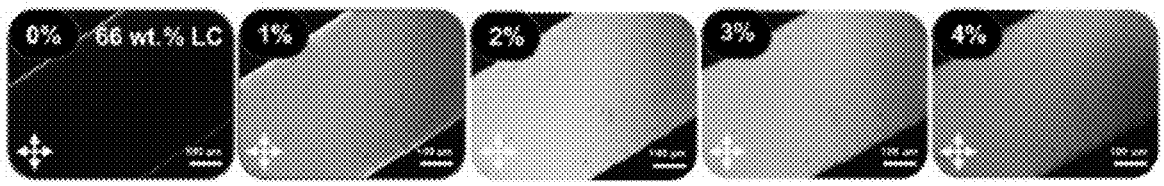
FIG. 13A is a series of optical and polarized optical images of Iso film before elongation, immediately after elongation, and at an extended time after elongation.
Figure 13B:
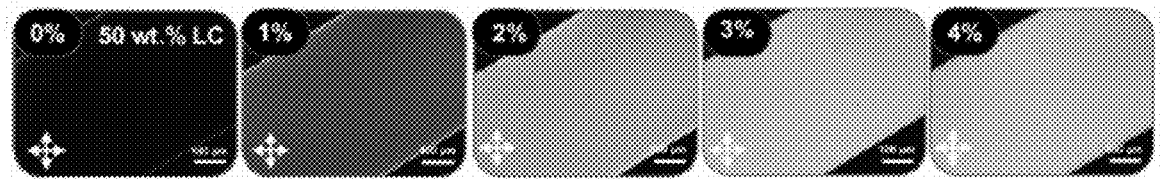
FIG. 13B is a series of optical and polarized optical images of NG-PD-LCE film before elongation, immediately after elongation, and at an extended time after elongation.
Figure 13C:
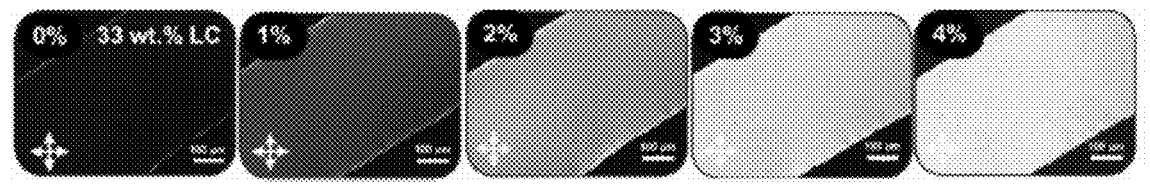
FIG. 13C is a series of optical and polarized optical images of IG-PD-LCE films film before elongation, immediately after elongation, and at an extended time after elongation.

The results in FIG. 7 illustrate some of the limitations in utilizing the soft elastic response observable in polydomain LCEs. Mechanotropic deformation of the Iso composition circumvents these limitations, as the deformation strain is fully recovered in approximately 1 minute. Comparatively, the NG-PD-LCE and IG-PD-LCE films do not recover their deformation over the 10 minutes monitored in the experiment, recovering to residual strain values of 37% and 68%, respectively. The rate of elastic recovery in polydomain LCEs is known to be limited by the memory of the polymer network. In the IG-PD-LCE film, where polymerization occurred prior to LC phase formation, the polymer network has limited elastic memory of the polydomain state. Mechanical conversion (PD-MD transition) has been demonstrated to temporarily stabilize deformation. Consequently, following elongation and considerable reorganization of the LC mesogens to a monodomain orientation (FIGS. 4B and 4C), there is minimal elastic driving force to facilitate the recovery of the film to the initially undeformed state. The IG-PD-LCE film remains deformed for greater than 24 hours (FIG. 9). Mechanical recovery is improved in the NG-PD-LCE material as the memory of the initial polydomain state captured during photopolymerization limits the formation of a single crystal monodomain (lower orientation parameter, polydomain texture still visible under elongation; see FIG. 6 and FIG. 9), and provides a comparatively larger elastic driving force towards recovery of the initial LC organization. On average, the NG-PD-LCE film recovered its deformation in approximately 1 hour (FIG. 9).

Again, the Iso composition displayed significantly enhanced elasticity when compared to analogous IG-PD-LCE and NG-PD-LCE films. It has been postulated that in the case of a polydomain LCE, the recovery of the initially disorganized state requires the concerted motion of each ordered domain. Comparatively, the LC mesogens in the Iso composition do not recover to an ordered state. Accordingly, recovery to the network memory is unencumbered by the presence of neighboring LC domains (each containing their own director orientation) allowing the Iso composition to elastically recover similar to traditional rubber.

Example 4

To highlight the influence of the mesogenic constituents in enabling the nonlinear mechanical deformation of the isotropic elastomers, a series of elastomers were synthesized containing various concentrations of LC monomer. The crosslink density of the isotropic elastomers was increased relative to Iso to enable comparison over a wider range of LC monomer concentrations. Similar to the Iso film, a thiol-ene composition of RM2AE and TMPMP (66 wt % LC monomer), mixed in a 1:1 stoichiometric functional group ratio, was polymerized as previously described. Compositions were prepared by replacing RM2AE with a 2:1 mole ratio of TMPDA:HexSH2 ("Control", FIG. 6a). TMPDA and HexSH2 were chosen because they have an approximately similar molecular weight between crosslinks as RM2AE when reacted with two TMPMP molecules (RM2AE, MWc, FIG. 6a). The concentration of RM2AE was decreased to 50, 33, and 0 wt % while maintaining a stoichiometric functional group ratio. All films were photopolymerized at 80° C. with a 405 nm light source (10 min, 50 mW/cm2). Despite similar gel fractions (Table 2), decreasing the concentration of rod-like RM2AE molecules shifted the glass transition to lower temperatures (as low as −44.2° C. for the 0 wt % LC film; FIG. 7). To limit the influence of Tg on the mechanical measurements, tensile testing was conducted at Tg+20° C. for each of the control films. The results are presented in FIG. 6b (film aspect ratio of 4, strain rate of 10% min$^{-1}$). While all liquid crystal containing films displayed similar strains at break (~187%), the stress at break decreased from 20.2±3.07 MPa for the isotropic elastomer with 66 wt % LC (Iso-66) to 9.98±0.51 MPa and 3.62±0.57 MPa for the isotropic elastomers with 50 wt % (Iso-50) and 33 wt % LC (Iso-33) concentrations. In the 0 wt % isotropic elastomer (Iso-0), where no LC reorientation can occur, the thiol-ene network displayed a decrease in both stress (1.36±0.10 MPa) and strain (99±13%) at break.

TABLE 2

Materials properties of varied wt. % LC isotropic thiol-ene films

| Iso LC wt. % | $T_g$ (° C.) | Gel Frac. (%) | Stress at Break (MPa) | Strain at Break (%) | Toughness (MJ*m$^{-3}$) |
|---|---|---|---|---|---|
| 0 | −44.21 | 96.7 ± 0.2 | 1.36 ± 0.10 | 99 ± 13 | 5.70 |
| 33 | −24.81 | 97.9 ± 1.2 | 3.62 ± 0.57 | 188 ± 18 | 21.66 |
| 50 | −10.50 | 98.1 ± 0.9 | 9.98 ± 0.51 | 188 ± 10 | 38.51 |
| 66 | 3.72 | 98.5 ± 0.9 | 20.2 ± 3.07 | 188 ± 2 | 72.92 |

The observed decrease in stress at break is attributed to the decreased liquid crystal content and thus a reduction in the magnitude of the strain hardening behavior. At lower concentrations of liquid crystal, less reorientation is able to occur, as evident in the WAXD patterns of the isotropic thiol-ene films collected at the maximum achievable extension and shown in FIG. 6c. The x-ray patterns shown in FIG. 6c were collected at room temperature. Consequently, Iso-33 and Iso-0 compositions, which display considerably decreased Tg's, could only to be strained to 120% and 70%, respectively, in contrast to the 150% achieved for the Iso-66 and Iso-50 compositions. The calculated orientation parameter at the maximum achievable extension steadily decreased from 0.31 for Iso-66 to 0.22 and 0.10 for Iso-50 and Iso-33, respectively (similar behavior was observed in POM as decreased birefringence at low to moderate strains—FIG. 8 and FIG. 9). In the Iso-0 composition, a clear amorphous halo is observed, and the orientation parameter was calculated as 0.06 upon deformation. Despite, the variation in maximum elongation, the reduced orientation parameters highlight the association of the mechanotropic response to the prevalence of mesogenic character in the elastomeric networks. The mechanotropic orientation observed in Iso-66 increases the toughness by 1280% compared to Iso-0. Thiol-ene polymer networks are typically brittle[13] and few examples of tough thiol-ene polymers prepared via a single reaction step have been reported in the literature[14].

Background on Experimental Setup

Materials: Trimethylolpropane tris(3-mercaptopropionate) (TMPMP), 1,6-hexanedithiol (HexSH2), and trimethylolpropane diallyl ether (TMPDA) were purchased from Sigma Aldrich. Ethylene glycol bis(3-mercaptopropionate (GDMP) was purchased from TCI. Methylene chloride was purchased from Fisher Scientific. 2-methyl-1,4-phenylene bis(4-(3-(allyloxy)propoxy)benzoate) (RM2AE) was purchased from Synthon Chemical. 2-methyl-1,4-phenylene bis(4-(6-mercaptohexyloxy)benzoate) (RM2SH) was purchased from Alphamicron. Irgacure 819 was purchased from BASF.

Preparation of Isotropic and Polydomain LCE Networks: All liquid crystal containing networks were synthesized maintaining a 1:1 mole thiol functionality to mole alkene functionality with a weight-average thiol functionality of 2.5 ($f_{w,SH}$=2.5) and weight-average alkene functionality of 2 ($f_{w,ene}$=2). Isotropic formulations were prepared via the following general method: RM2AE (70.5 mg, 0.126 mmol), TMPMP (16.7 mg, 0.042 mmol), GDMP (15.0 mg, 0.063 mmol) and Irgacure 819 (2.04 mg, 2 wt. %) were combined in a vial and heated under vigorous mixing until homogenous. The monomer mixture was then sandwiched between two glass slides at a thickness of 110 μm and equilibrated at a temperature of 80° C. Photopolymerization was triggered under a 405 nm light (10 mins, 50 mW/cm$^2$). To ensure complete polymerization, all samples were baked at 150° C. for 10 minutes following 405 nm light exposure. Synthesized films were cooled and equilibrated overnight at room temperature before being cut to the appropriate shape for characterization. Preparation of isotropic-genesis and nematic-genesis polydomain films follow a nearly identical procedure: RM2AE (70.5 mg, 0.126 mmol), RM2SH (37.5 mg, 0.063 mmol), and TMPMP (16.7 mg, 0.042 mmol) were combined in a vial with Irgacure 819 (2.49 mg, 2 wt. %), mixed until homogenous, and sandwiched between glass slides as previously described. For nematic-genesis polydomain, samples were first cooled into the polydomain state and then photopolymerized at room temperature. For isotropic-genesis polydomain, photopolymerization was conducted at 80° C. and then the film was cooled to its polydomain state. Each preparation method included a 150° C. baking step prior to overnight equilibration at room temperature.

Preparation of Iso 0-66 Thiol-ene Control Networks: Thiol-ene control networks were designed to contain an approximately similar molecular weight between crosslinks as an isotropic LCE film composed of RM2AE and TMPMP (66 wt. % LC film, $f_{w,SH}$=3.0 and $f_{w,ene}$=2.0) synthesized in a stoichiometric alkene to thiol mole functional group ratio. Therefore, the 0 wt. % isotropic film was prepared with TMPMP (33.4 mg, 0.084 mmol), 1,6-hexanedithiol (18.9 mg, 0.126 mmol), TMPDA (53.9 mg, 0.252 mmol), and Irgacure 819 (2.12 mg, 2 wt. %). Formulations were sandwiched between two glass slides at a thickness of 110 μm and photopolymerized for 10 minutes under 405 nm light (50 mW/cm$^2$). Samples were then baked at 150° C. for 10 minutes before being cooled and harvested for characterization. Higher wt. % LC films were prepared by doping in increasing concentrations of RM2AE in place of TMPDA and HexSH2. In the 66 wt. % LC film, all of the alkene functional groups originate from RM2AE. In the 50 wt. % and 33 wt. % LC films, 75 mol % and 50 mol % of the alkene functional groups, respectively, originate from RM2AE. A 1:1 alkene:thiol mol functional group ratio is maintained in all films.

Materials Characterization: All thermomechanical and mechanical characterization was conducted on a TA Instruments DMA 850 with TRIOS v4.4.0 operating software. Samples for mechanical testing were cut to be rectangular with an aspect ratio of four. Stress-strain curves were generated via uniaxial strain rate testing of thiol-ene films at room temperature (~22° C.) with a strain rate of 10% min$^{-1}$. Reported values are the average of a minimum five trials. Mechanical characterization conducted at lower temperature was equilibrated at the indicated temperature for 5 minutes prior to elongation. Creep-recovery experimentation was conducted at room temperature by applying a constant force of to all samples and monitoring the strain over 20 minutes. Thermal analysis was collected on a TA Instruments DSC 2500 with TRIOS v4.4.0 operating software. Samples were subjected to a heat-cool-heat cycle with a heating rate of 10° C. min$^{-1}$ and a cooling rate of 5° C. min$^{-1}$. All experiments were conducted under a nitrogen atmosphere. Gel fractions were averaged over 5 samples per film. Each sample was placed in methylene chloride for 48 hours before being dried under vacuum and weighed. Polarized optical micrographs were collected on a Nikon Eclipse Ci-Pol with a universal Epi-illumination attachment and an Instec HCS402 heating stage with MK2000-48 VDC-5A-S temperature controller. Wide-angle X-ray diffraction (WAXD) measurements were conducted with a Forvis Technologies X-ray instrument equipped with a 30 W Genix 3D X-ray generator with a copper anode (wavelength=1.5405 Å and energy=8.05092 keV) and a Dectris Eiger R 1M detector with pixel size of 75×75 mm$^2$. A flux of 4×10$^7$ X-ray photons sec$^{-1}$ was achieved with a beam size of 0.8×0.8 mm$^2$ at the sample position. Sample to detector distance was 166 mm. WAXS images are made of a 2×3 stich, with each area of the stitch exposed to x-ray irradiation for 6 minutes.

From the foregoing, it will be appreciated that specific embodiments of the invention have been described herein for purposes of illustration, but that various modifications may be made without deviating from the scope of the invention. Accordingly, the invention is not limited except as by the appended claims.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended.

Unless otherwise indicated, all number or expressions, such as those expressing dimensions, physical characteristics, etc., used in the specification (other than the claims) are understood as modified in all instances by the term "approximately". At the very least, and not as an attempt to limit the application of the doctrine of equivalents to the claims, each numerical parameter recited in the specification or claims which is modified by the term "approximately" should at least be construed in light of the number of recited significant digits and by applying rounding techniques. Moreover, all ranges disclosed herein are to be understood to encompass and provide support for claims that recite any and all sub-ranges or any and all individual values subsumed therein. For example, a stated range of 1 to 10 should be considered to include and provide support for claims that recite any and all sub-ranges or individual values that are between and/or inclusive of the minimum value of 1 and the maximum value of 10; that is, all sub-ranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

We claim:
1. An isotropic polymer comprising:
a first monomer having an alkene functionality; and
a second monomer comprising an isotropic monomer selected from the group consisting of tris(3-mercaptopropionate) (TMPMP), ethylene glycol bis (3-mercaptopropionate) (GDMP), or a combination thereof;
wherein the first monomer comprises a liquid crystal monomer; and
wherein the second monomer suppresses the formation of a liquid crystalline phase in the isotropic polymer prior to the application of a mechanical force on the isotropic polymer.

2. The isotropic polymer of claim 1, wherein the alkene functionality of the first monomer and the thiol functionality of the second monomer form a covalent bond in the isotropic polymer.

3. The isotropic polymer of claim 1, wherein the isotropic polymer comprises from about 50 wt % to about 99 wt % of the first monomer.

4. The isotropic polymer of claim 3, wherein the isotropic polymer comprises from about 60 wt % to about 80 wt % of the first monomer.

5. The isotropic polymer of claim 3, wherein the isotropic polymer comprises about 66 wt % of the first monomer.

6. The isotropic polymer of claim 3, wherein the isotropic polymer comprises about 75 wt % of the first monomer.

7. The isotropic polymer of claim 1, wherein the first monomer comprises a liquid crystal monomer selected from the group consisting of is 2-methyl-1,4-phenylene bis(4-(3-(allyloxy)propoxy)benzoate) (RM2AE), 2-methyl-1,4-phenylene bis(4-(6-mercaptohexyloxy)benzoate) (RM2SH), or a combination thereof.

8. The isotropic polymer of claim 1, wherein:
the first monomer is 2-methyl-1,4-phenylene bis(4-(3-(allyloxy)propoxy)benzoate) (RM2AE); and the second monomer is a combination of tris(3-mercaptopropionate) (TMPMP) and ethylene glycol bis(3-mercaptopropionate) (GDMP).

9. The isotropic polymer of claim 8, wherein the isotropic polymer comprises about 66 wt % of the first monomer.

10. The isotropic polymer of claim 8, wherein the first monomer further comprises 2-methyl-1,4-phenylene bis(4-(6-mercaptohexyloxy)benzoate) (RM2SH) and the isotropic polymer comprises about 75 wt % of the first monomer.

11. The isotropic polymer of claim 1, wherein the molar ratio between the alkene functionality of the first monomer and the thiol functionality of the second monomer is about 1:1.

12. A method of preparing an isotropic polymer, comprising:
    photopolymerizing a first monomer having an alkene functionality and a second monomer comprising an isotropic monomer selected from the group consisting of tris(3-mercaptopropionate) (TMPMP), ethylene glycol bis (3-mercaptopropionate) (GDMP), or a combination thereof;
    wherein the first monomer comprises a liquid crystal monomer;
    wherein following photopolymerization, the isotropic polymer is free of a liquid crystal phase prior to the application of a mechanical force on the isotropic polymer.

13. The method of claim 12, wherein the method further comprises:
    mixing the first monomer and the second monomer prior to photopolymerizing to form a mixture;
    wherein the mixture of the first monomer and the second monomer comprises from about 50 to about 99 wt % of the first monomer.

14. The method of claim 12, wherein the molar ratio between the alkene functionality of the first monomer and the thiol functionality of the second monomer is about 1:1.

* * * * *